(12) United States Patent
Kusano

(10) Patent No.: US 7,825,368 B2
(45) Date of Patent: Nov. 2, 2010

(54) ABSOLUTE POSITION LENGTH-MEASUREMENT TYPE ENCODER

(75) Inventor: Kouhei Kusano, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 184 days.

(21) Appl. No.: 12/100,017

(22) Filed: Apr. 9, 2008

(65) Prior Publication Data

US 2008/0252906 A1    Oct. 16, 2008

(30) Foreign Application Priority Data

Apr. 11, 2007    (JP) .............................. 2007-104122

(51) Int. Cl.
*G01D 5/34*    (2006.01)
(52) U.S. Cl. ........................... 250/231.18; 250/231.13; 250/231.14; 356/616; 33/1 PT
(58) Field of Classification Search ............ 250/231.13, 250/231.14, 231.16, 231.17, 231.18; 356/614, 356/616, 617; 33/1 PT, 706, 707
See application file for complete search history.

(56) References Cited

U.S. PATENT DOCUMENTS 5,129,725 A * 7/1992 Ishizuka et al. ............. 356/617

FOREIGN PATENT DOCUMENTS

| EP | 0331828 | 9/1989 |
|----|---------|--------|
| EP | 0577104 A1 | 1/1994 |
| JP | 07-286861 | 10/1995 |
| WO | 97/40345 | 10/1997 |

* cited by examiner

*Primary Examiner*—Kevin Pyo
(74) *Attorney, Agent, or Firm*—Rankin, Hill & Clark LLP

(57) ABSTRACT

An absolute position length-measurement type encoder includes a scale having an incremental track, an absolute track, and a reference position track. The incremental track has incremental patterns including first light and dark patterns formed at equal intervals in first periods. The absolute track has absolute patterns representing an absolute position. The reference position track has reference position patterns including second light and dark patterns formed at equal intervals in second periods longer than the first periods. A light source emits a measurement light to the scale. A photodetector receives the measurement light reflected at or transmitted through the scale. A signal processing circuit processes the received light signal of the photodetector to detect an absolute position of the scale.

14 Claims, 12 Drawing Sheets

ABSOLUTE POSITION LENGTH-MEASUREMENT TYPE ENCODER

CROSS REFERENCE TO RELATED APPLICATIONS

This application is based on and claims the benefit of priority from prior Japanese Patent Application No. 2007-104122, filed on Apr. 11, 2007, the entire contents of which are incorporated herein by reference.

BACKGROUND OF THE INVENTION

1. Field of the Invention

The present invention relates to an absolute position length-measurement type encoder.

2. Description of the Related Art

Incremental encoders and absolute encoders are known as devices for measuring travel distances of objects. The incremental encoders measure relative travel distances and absolute encoders allow for absolute position length-measurement.

In the case of photoelectric encoders, the incremental encoders have incremental tracks with incremental patterns including equally-spaced light and dark patterns. Based on these patterns, the incremental encoders count light and dark signals to detect relative travel distances. In addition, the incremental encoders may detect absolute travel distances by detecting origin detection patterns provided separately from the above-mentioned pattern with equally-spaced light and dark patterns, and then detecting relative travel distances from the origin. However, prior to the measurement, a scale must be moved to right and/or left directions in order to read origin detection patterns.

On the other hand, the absolute encoders have absolute tracks with absolute patterns representing pseudo-random codes such as M-sequence codes and detect absolute positions resulting from reading the absolute patterns for a corresponding object. Unlike the incremental encoders, the absolute encoders does not require any origin detection based on origin detection patterns and may start measurement from the very position when powered on, without moving the scale. However, the absolute encoders have a lower detection accuracy than the incremental encoders.

As such, an absolute position length-measurement type encoder is known where an incremental track with equally-spaced incremental patterns and an absolute track with absolute patterns representing pseudo-random codes are positioned in parallel on one scale, as disclosed in, e.g., JP H7-286861A. This encoder first detects the absolute position after powered on by reading absolute patterns on the absolute track. Then, the encoder detects a relative travel distance from that position by reading the incremental patterns on the incremental track. In this way, an absolute position length-measurement type encoder may be obtained that covers the shortcomings of each of the incremental and absolute encoders, while enjoying advantages of both encoders.

However, in encoders so configured, it is more difficult to form minute absolute patterns with respect to incremental patterns without positional errors, as incremental patterns have more minute light and dark pitches. In addition, as the entire length of a scale becomes longer, it is more difficult to maintain a relative phase relation between absolute patterns and incremental patterns throughout the scale.

Therefore, it is difficult to provide smaller absolute position length-measurement type encoders in which both absolute and incremental patterns are used.

SUMMARY OF THE INVENTION

An absolute position length-measurement type encoder according to the present invention comprises: a scale having an incremental track formed therein with incremental patterns including first light and dark patterns formed at equal intervals in first periods, an absolute track formed therein with absolute patterns representing absolute positions, and a reference position track formed therein with reference position patterns including second light and dark patterns formed at equal intervals in second periods longer than the first periods; a light source for emitting a measurement light to the scale; a photodetector for receiving the measurement light reflected at or transmitted through the scale; and a signal processing circuit for processing a received-light signal of the photodetector to detect an absolute position of the scale.

According to this encoder, the absolute patterns does not need to be formed precisely in relation to the incremental patterns with light and dark patterns formed therein at first periods, but rather it is sufficient to form the absolute patterns with a predetermined accuracy with respect to the reference position patterns that are formed at second periods larger than the first periods. Accordingly, the absolute patterns may accept larger position errors with respect to the incremental patterns, which may lead to more minute incremental patterns as well as improved accuracy encoders.

DETAILED DESCRIPTION OF THE EMBODIMENTS

Embodiments of the present invention will now be described in detail below with reference to the accompanying drawings.

First Embodiment

Figure 1:
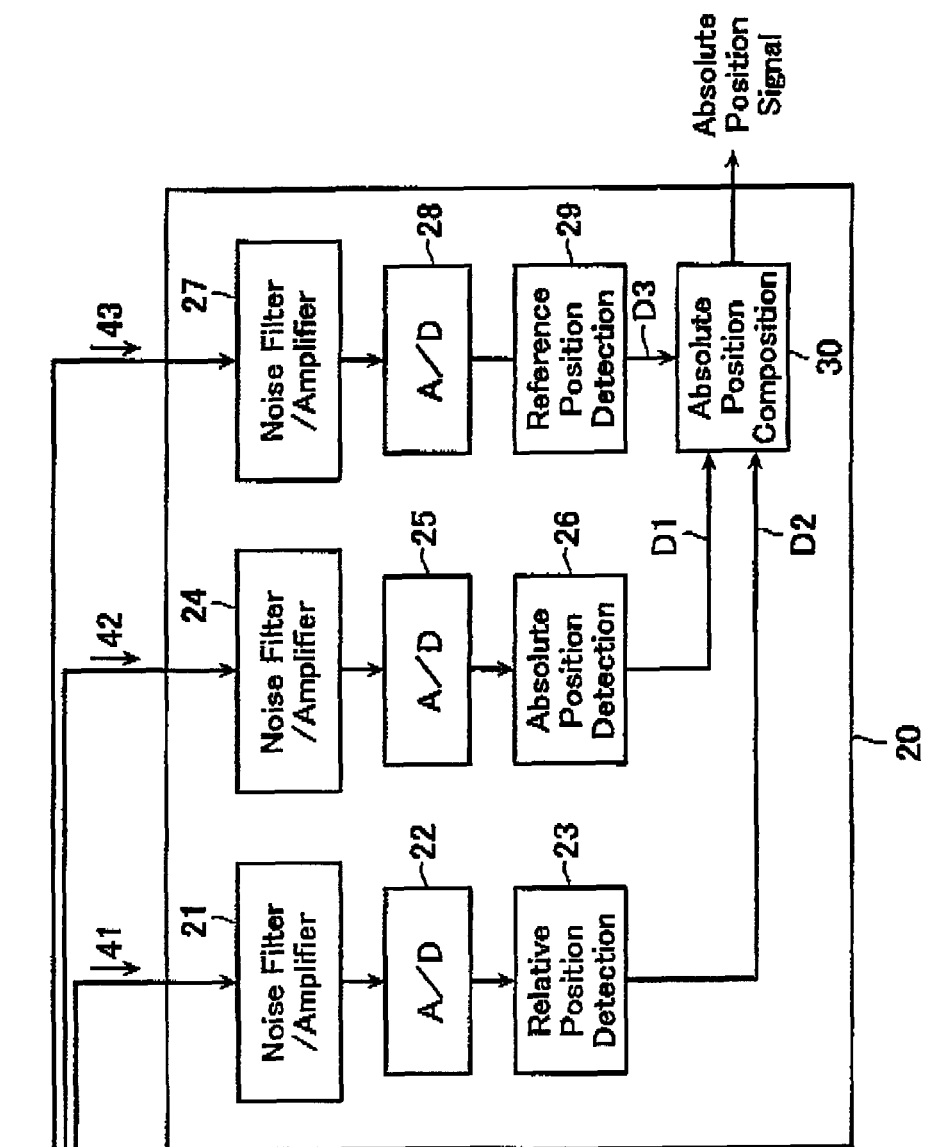
FIG. 1 is a schematic diagram illustrating an entire configuration of an absolute position length-measurement type photoelectric encoder according to a first embodiment of the present invention.

FIG. 1 is a schematic diagram illustrating an entire configuration of an absolute position length-measurement type photoelectric encoder according to a first embodiment of the present invention. The absolute position length-measurement type photoelectric encoder according to this embodiment comprises a light-emitting element 11, a scale 12, a lens 13, a photodiode array 14, and a signal processing circuit 20.

Figure 2:
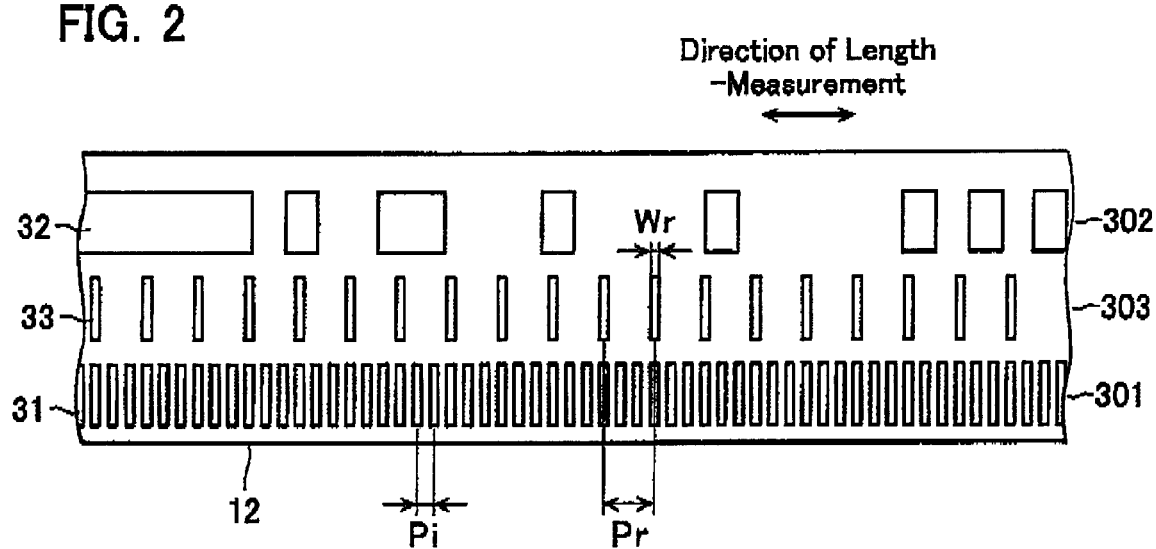
FIG. 2 is a plan view illustrating a configuration of the scale 12 in FIG. 1.

The light-emitting element 11 is a light source, such as a laser diode, that emits a coherent light. As illustrated in FIG. 2, the scale 12 is configured to form the following tracks on a transparent glass substrate: an incremental track 301 with incremental patterns 31 formed at an arrangement pitch Pi (e.g., 40 μm) that include equally-spaced light and dark regions, and an absolute track 302 with general absolute patterns 32 that represent absolute positions in pseudo-random patterns (in this case, M-sequence codes).

In addition to this, the scale 12 further comprises a reference position track 303 with reference position patterns 33, each of which has a width of Wr in a direction of length-measurement. The reference position patterns 33 have a pre-determined phase relation to the absolute patterns 32 and are formed at an arrangement pitch Pr (>Pi) with equally-spaced light and dark regions. That is, the absolute patterns 32 represent absolute positions of the equally-spaced patterns in the reference position patterns 33. The arrangement pitch Pi of the incremental patterns 31 is set to be smaller than the arrangement pitch Pr of the reference position patterns 33, e.g., by a factor of an integer. In this embodiment, for illustration, it is assumed that Pi=4Pr. For example, if Pi=40 μm, then Pr is set to 160 μm.

The incremental patterns 31 and the reference position patterns 33 may easily be formed in an accurate fashion throughout the whole length of the encoder, since both are formed at equally-spaced arrangement pitches (Pi, Pr) throughout the length, respectively. In contrast, the absolute patterns 32 are difficult to be formed in an accurate fashion throughout the length of the encoder, since none of the regions in the absolute patterns 32 is the same throughout the length.

In this case, It is assumed here that, as in the prior art, an encoder has only incremental patterns 31 and absolute patterns 32, without any reference position pattern 33. According to such the encoder, for example, provided that the arrangement pitch of the incremental patterns 31 is 40 μm, then the absolute patterns 32 must have an accuracy less than one-half of the arrangement pitch, i.e., less than ±20 μm, throughout the length of the scale 12.

As in this embodiment, if the reference position patterns 33 are formed at an arrangement pitch Pr larger than the arrangement pitch Pi of the incremental patterns 31, such a position accuracy is sufficient for the absolute patterns 32 that is set to the same level as the arrangement pitch Pr of the reference position patterns 33. In this way, the absolute patterns 32 may accept larger position errors. For example, if the arrangement pitch Pr of the reference position patterns 33 is four times larger than Pi, i.e., 160 μm, then the absolute patterns 32 may accept position errors up to ±80 μm throughout the length of the scale 12. This means that the arrangement pitch Pi of the incremental patterns 31 can be determined regardless of the accuracy of the absolute patterns 32. For example, the arrangement pitch Pi may be smaller than the positional accuracy of the absolute pattern 32. Therefore, this embodiment may provide a more minute pitch of the incremental patterns 31, which would provide improved accuracy in the encoder.

The light-emitting element 11 emits the scale 12. Then, the irradiated light transmitted through the scale 12 is projected through the lens 13 onto the photodiode array 14.

Figure 3:
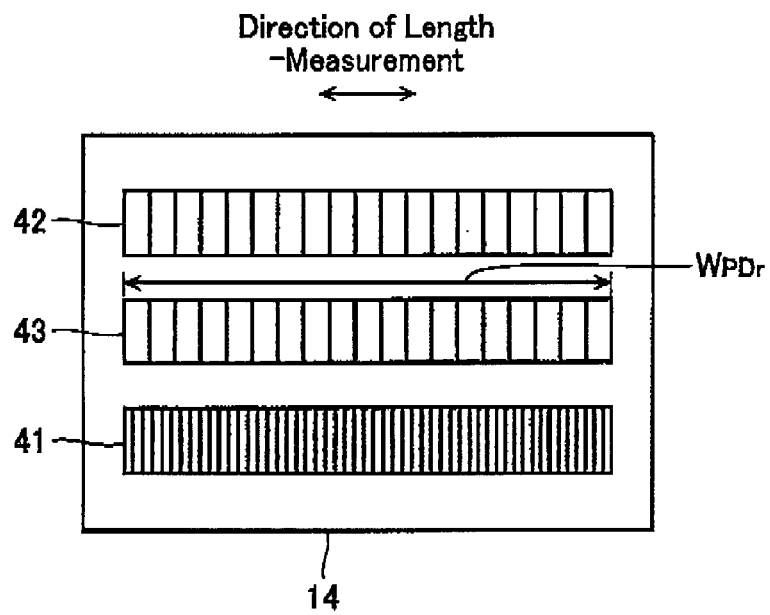
FIG. 3 is a plan view illustrating a configuration of the photodiode array 14 in FIG. 1.

As illustrated in FIG. 3, the photodiode array 14 comprises an INC photodiode array 41, an ABS photodiode array 42, and a reference position photodiode array 43, corresponding to the incremental track 301, the absolute track 302, and the reference position track 303, respectively. Each of the photodiode arrays 41 to 43 is configured to arrange photodiodes therein at a respective arrangement pitch corresponding to each of the corresponding patterns 31 to 33.

The INC photodiode array 41 has four sets of photodiode arrays, each with a phase difference of 90°, respectively, and detects light and dark signals based on the incremental patterns 31 to output a quadrature sine wave signal with a phase difference of 90°. The ABS photodiode array 42 outputs signals resulting from sweeping light and dark signals based on the absolute patterns in a direction of length-measurement. In addition, a dimension WPDR (WPDR>Pr+Wr) in a direction of length-measurement is set for the reference position photodiode array 43 such that at least one or more reference position patterns 33 can be detected. The reference position photodiode array 43 outputs signals resulting from sweeping light and dark signals based on the reference position patterns 33 in the direction of length-measurement.

Now returning to FIG. 1, further description will be given below. By way of an example, a signal processing device 20 comprises a noise filter/amplifier circuit 21, an A/D converter 22, a relative position detection circuit 23, a noise filter/amplifier circuit 24, an A/D converter 25, an absolute position detection circuit 26, a noise filter/amplifier circuit 27, an A/D converter 28, a reference position detection circuit 29, and an absolute position composition circuit 30.

The noise filter/amplifier circuit 21 removes noises in an analog output signal (a quadrature signal with a phase difference of 90°) provided by the INC photodiode array 41. Then, the noise filter/amplifier circuit 21 amplifies and outputs the analog output signal. The A/D converter 22 converts the analog output signal output from the noise filter/amplifier circuit 21 to a digital signal. Through an arc-tangent calculation on the amplitude of the resulting digital signal (with a phase difference of 90°), the relative position detection circuit 23 outputs a relative position signal D2 that indicates a relative travel distance and a travel direction of the scale 12.

The noise filter/amplifier circuit 24 removes noises in an analog output signal (absolute position signal) provided by the ABS photodiode array 42. Then, the noise filter/amplifier circuit 24 amplifies and outputs the analog output signal. The A/D converter 25 converts the analog output signal output from the noise filter/amplifier circuit 24 to a digital signal. In this case, the converted digital signal includes data of M-sequence codes represented by the absolute patterns 32.

The absolute position detection circuit 26 has a table (not illustrated) that indicates a relationship between the M-sequence codes and absolute positions represented by the M-sequence. The absolute position detection circuit 26 refers to the table to output an absolute position signal D1 that indicates an absolute position of the scale 12.

The noise filter/amplifier circuit 27 removes noises in an analog output signal provided by the reference position photodiode array 43. Then, the noise filter/amplifier circuit 27 amplifies and outputs the analog output signal. The A/D converter 28 converts the analog signal output from the noise filter/amplifier circuit 27 to a digital signal. Then, the reference position detection circuit 29 outputs a reference position signal D3 that indicates reference positions of the reference position patterns included in the digital signal.

Figure 4:
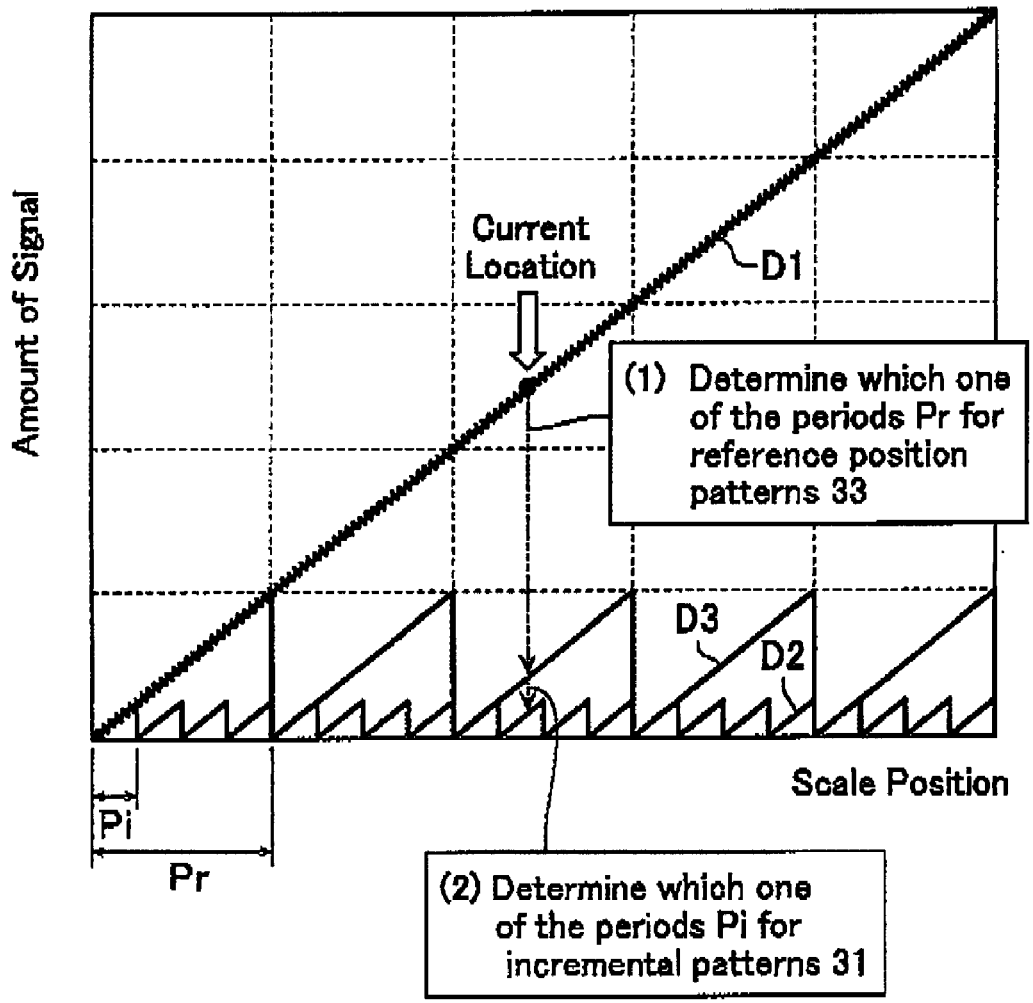
FIG. 4 illustrates operations of the absolute position length-measurement type photoelectric encoder according to the first embodiment.

Based on the absolute position signal D1, relative position signal D2, and reference position signal D3, the absolute position composition circuit 30 calculates minute absolute positions of the scale 12. Referring to FIG. 4, operations of the absolute position composition circuit 30 will be described below. The absolute position signal D1 has information for absolute positions of the scale 12. Since the absolute patterns 32 are formed with a predetermined accuracy with respect to the reference position patterns 33, it is possible to determine which one of periods Pr the scale 12 is located in for the reference position patterns 33 by obtaining absolute positions from the absolute position signal D1 ((1) of FIG. 4).

After the one of the periods Pr is determined for the reference position patterns 33, the amount of signal for the reference position signal D3 is detected. Then, it is possible to determine which period the scale 12 is located in for the incremental patterns 31 ((2) of FIG. 4). Since the incremental patterns 31 and the reference position patterns 33 are formed with equally-spaced light and dark patterns, respectively, it is easy to maintain a position accuracy between these patterns at a high level even if the ratio of the arrangement pitches Pr and Pi is high. Therefore, by determining the period in which the scale 12 is located for the reference position patterns 33 and detecting the amount of signal for the reference position signal D3, it is possible to determine which period the scale 12 is located in for the incremental patterns 31. Thereafter, absolute positions of the scale 12 may be calculated and output by counting light and dark regions of the relative position signal D2 obtained from the incremental patterns 31.

As can be seen from the above, according to this embodiment, an absolute position of the scale 12 is detected in relation to the reference position patterns 33, based on the absolute position signals D1 obtained from the absolute patterns 32. Then, precision absolute position information of the scale 12 may be obtained, according to the reference position signal D3 based on the reference position patterns 33 and the relative position signal D2 based on the incremental patterns 31. The absolute patterns 32 are not required to have a position accuracy comparative to the incremental patterns 31 formed in a minute manner, but rather it is sufficient to form the absolute patterns 32 with a predetermined position accuracy with respect to the reference position patterns 33 with a larger arrangement pitch. Therefore, this embodiment may provide a more minute pitch of the incremental patterns 31, which would provide improved accuracy in the encoder.

Second Embodiment

Referring now to FIGS. 5 through 10, an absolute position length-measurement type photoelectric encoder according to a second embodiment of the present invention will be described below. In FIGS. 5 through 10, the same reference numerals represent the same components as the first embodiment and detail description thereof will be omitted herein.

Figure 5:
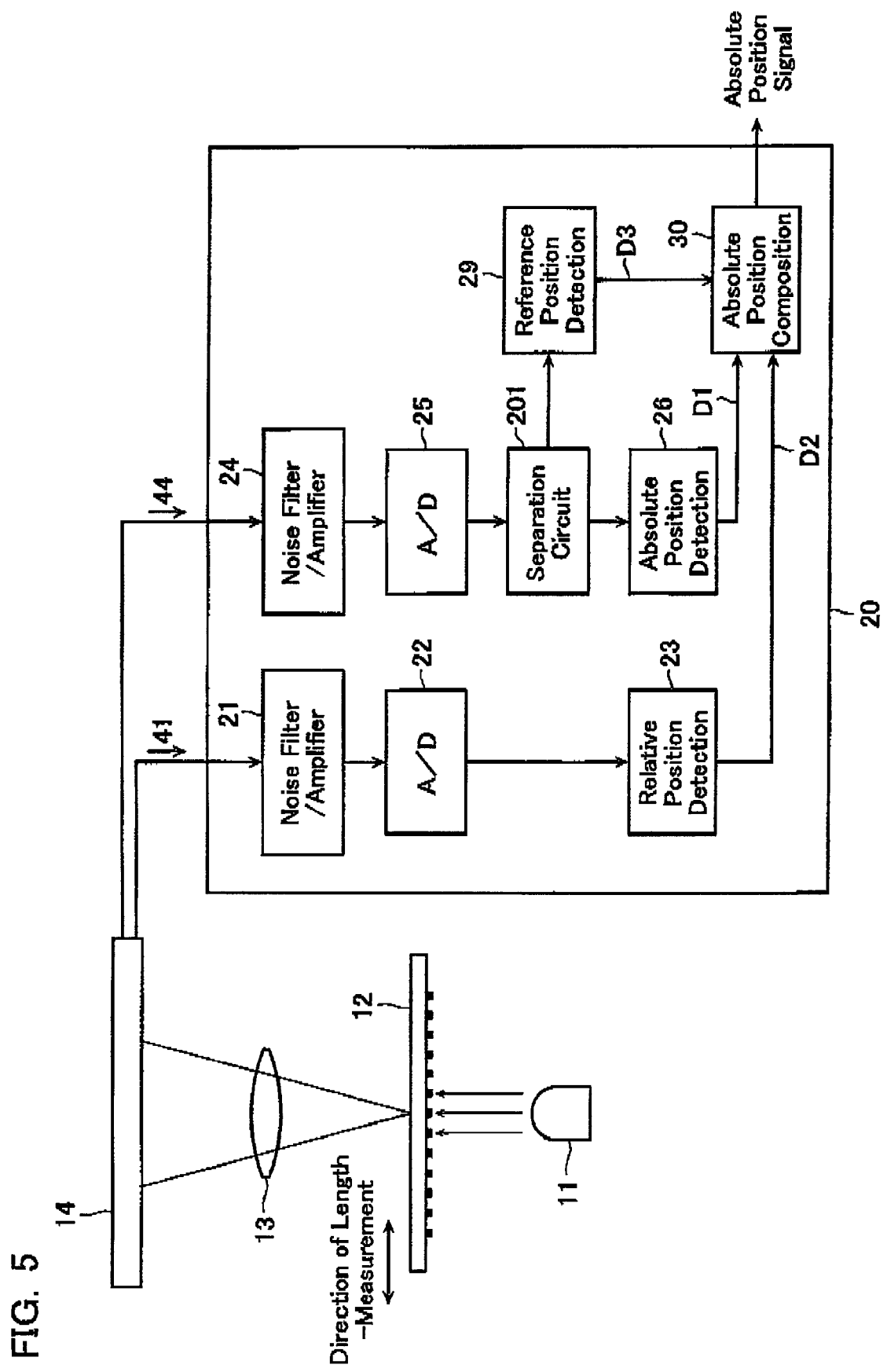
FIG. 5 is a schematic diagram illustrating an entire configuration of an absolute position length-measurement type photoelectric encoder according to a second embodiment of the present invention.
Figure 6:
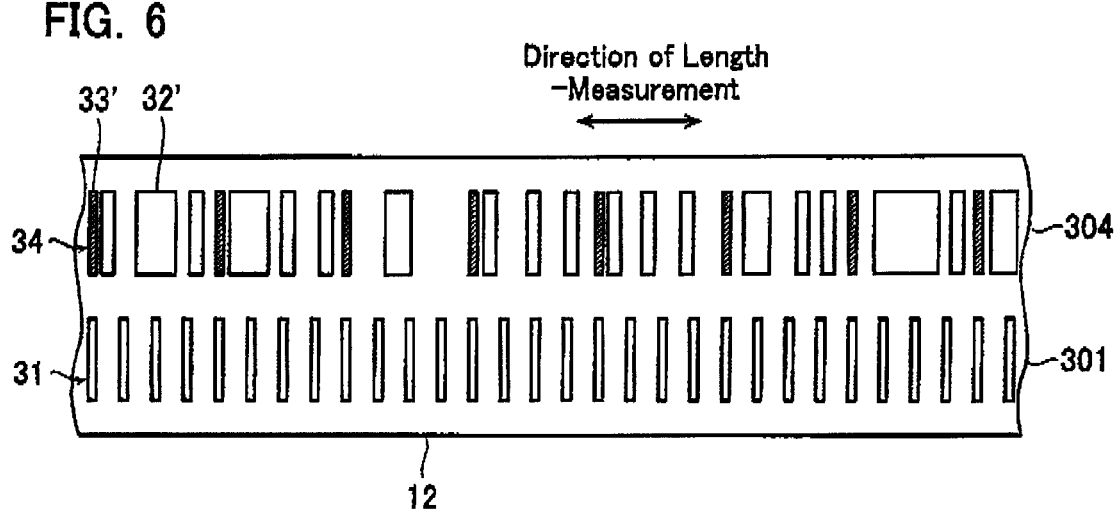
FIG. 6 is a plan view illustrating a configuration of the scale 12 in FIG. 5.
Figure 7:
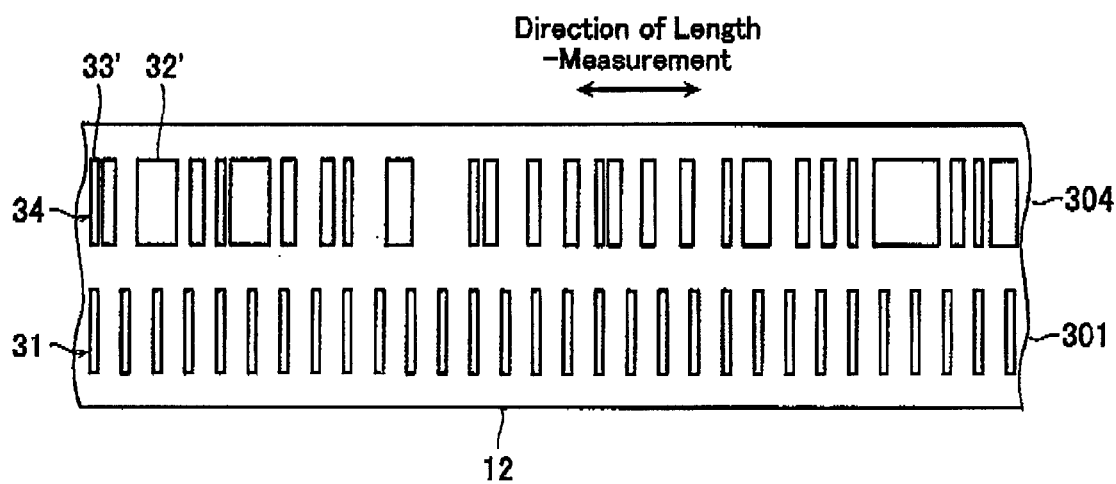
FIG. 7 is a plan view illustrating a configuration of the scale 12 in FIG. 6 without hatching.

FIG. 5 is a schematic diagram illustrating an entire configuration of the second embodiment, and FIG. 6 illustrates a plan configuration of the scale 12. This embodiment differs from the first embodiment in that, as illustrated in FIG. 6, it comprises, instead of the absolute patterns 32 and the reference position patterns 33, an ABS/reference position integrated track 304 with ABS/reference position integrated patterns 34, wherein these two types of patterns are integrated into one track. As illustrated in FIG. 6, the ABS/reference position integrated track 304 is formed with the following two types of patterns arranged in one track: absolute patterns 32' representing pseudo-random patterns and reference position patterns 33' arranged in gaps between the absolute patterns 32', at an arrangement pitch Pr larger than the arrangement pitch Pi of the incremental patterns 31. Besides, the reference position patterns 33' have hatching in FIG. 6, which is for clarity of illustration as the absolute patterns 32' and the reference position patterns 33' can be easily distinguished from each other. In an actual scale, as illustrated in FIG. 7, the absolute patterns 32' and the reference position patterns 33' are formed with the same material on the scale 12, different only in their shapes. In this embodiment, as described above, since the scale 12 involves only two tracks therein, the scale 12 may be easily made smaller in comparison to the first embodiment where three tracks are involved therein.

Figure 8:
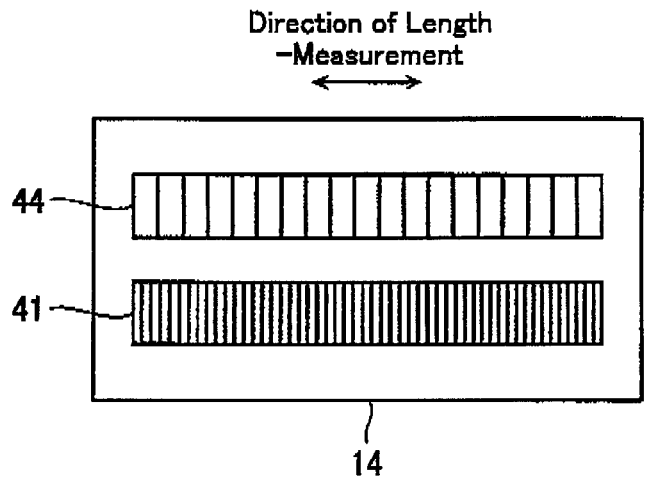
FIG. 8 is a plan view illustrating a configuration of the photodiode array 14 in FIG. 5.

In addition, corresponding to the scale 12 configured as above, the photodiode array 14 includes an INC photodiode array 41 and an ABS/reference position photodiode array 44 corresponding to each of the incremental track 301 and the ABS/reference position integrated pattern track 304, as illustrated in FIG. 8.

Further, as illustrated in FIG. 5, the signal processing circuit 20 of this embodiment has a configuration similar to the first embodiment for signal processing (21 to 23) based on the incremental patterns 31. On the other hand, the signals based on the ABS/reference position integrated patterns 34 as mentioned above are different from the first embodiment in that they are input to a separation circuit 201 via the noise filter/amplifier circuit 24 and the A/D converter 25. The separation circuit 201 has a function for separating a signal provided from the reference position patterns 33' from another provided from the absolute patterns 32' in the ABS/reference position integrated patterns 34. Such separation between these signals may be achieved through a correlation calculation between a signal based on the patterns 34 and a designed value of the reference position patterns 33'. That is, as a result of the correlation calculation, those signals may be obtained that are based on the reference position patterns 33'. As a correlation calculation, both multiplication type and subtraction type may be employed. The separated signal provided from the reference position patterns 33' is input to the reference position detection circuit 29, which in turn outputs a reference position signal D3.

Alternatively, those signals may be obtained that are based on the absolute patterns 32' as a result of calculation of a correlation between a signal based on the patterns 34 and a designed value of the absolute patterns 32'.

Figure 9:
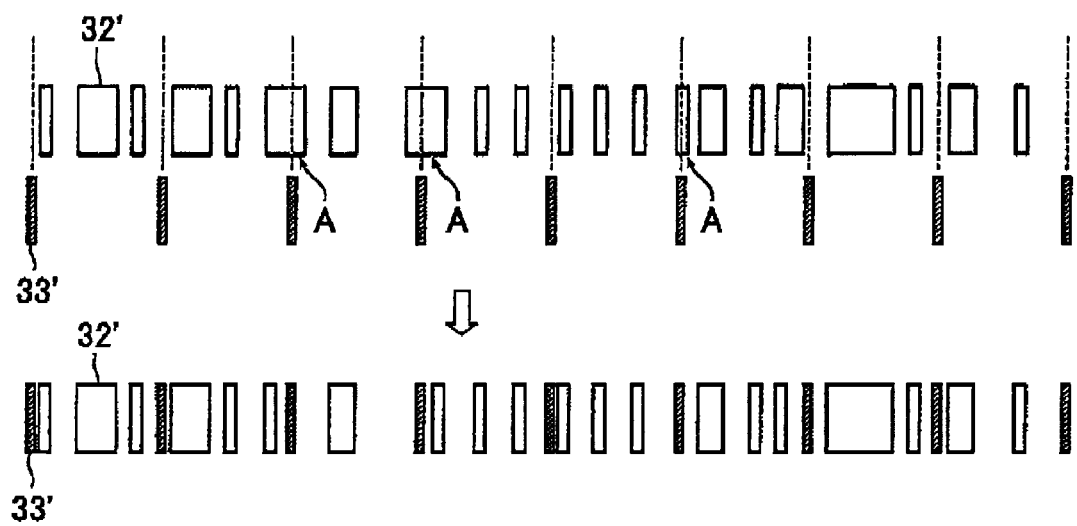
FIG. 9 is a schematic diagram illustrating details of the configuration of the ABS/reference position integrated scale 34 in the scale 12 illustrated in FIG. 5.
Figure 10:
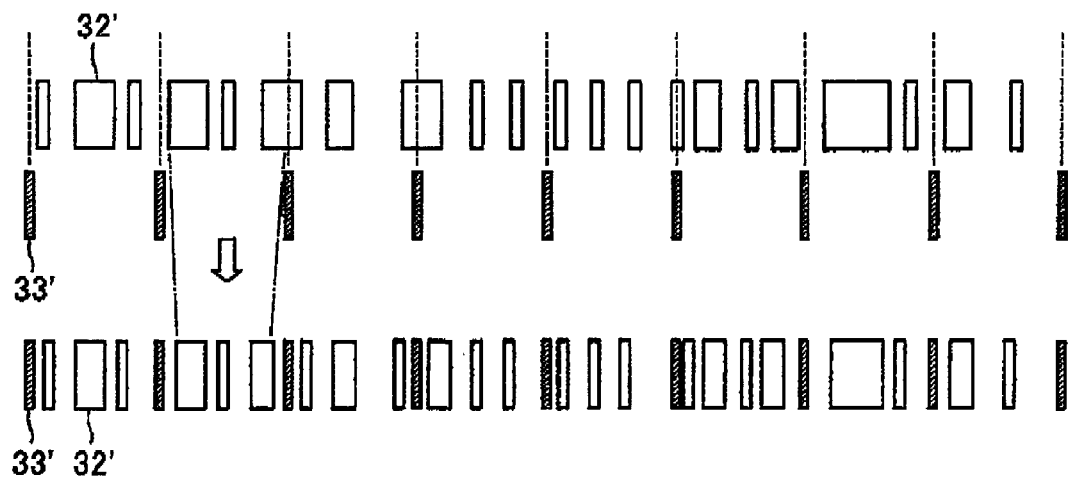
FIG. 10 is a schematic diagram illustrating details of the configuration of the ABS/reference position integrated scale 34 in the scale 12 in FIG. 6.

Referring now to FIGS. 9 and 10, an exemplary configuration of the ABS/reference position integrated patterns 34 according to this embodiment will be described below. FIG. 9 illustrates a first configuration. In the first configuration, the absolute patterns 32' and the reference position patterns 33' illustrated in the upper part of FIG. 9 are integrated in one track, which results in a configuration as illustrated in the lower part of FIG. 9. When these patterns are integrated, some of the absolute patterns 32' and the reference position patterns 33' overlap each other (in the regions indicated by arrow A). In the first configuration, the absolute patterns 32' are omitted in the overlapping regions and each of the reference position patterns 33' is formed at each of the positions (indicated by arrow A) instead. In this way, when the absolute patterns 32' are omitted (erased) in the regions indicated by arrow A, absolute positions may be detected as if the absolute patterns 32' were not omitted, as long as the designed values of the reference position patterns 33' (including information for the position of each arrow A) are known to the absolute position detection circuit 26.

FIG. 10 illustrates a second configuration. In this case, as illustrated in FIG. 10(a), if there is a region where some of the absolute patterns 32' and the reference position patterns 33' overlap each other, as illustrated in FIG. 10(b), the absolute patterns 32' are reduced in size and formed to eliminate any overlapping regions, instead of omitting such overlapping regions.

Third Embodiment

Figure 11:
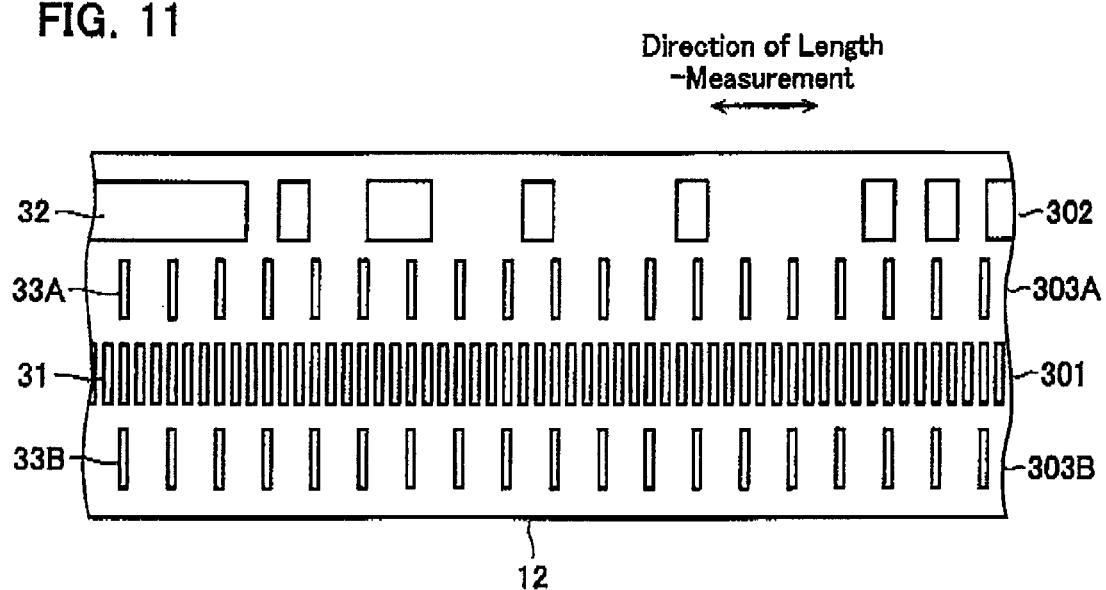
FIG. 11 illustrates a configuration of the scale 12 of an absolute position length-measurement type photoelectric encoder according to a third embodiment of the present invention.

FIG. 11 illustrates a configuration of an absolute position detection type encoder according to a third embodiment of the present invention. The entire configuration is substantially the same as the first embodiment (FIG. 1) and illustration thereof is omitted here.

This embodiment is different from the first embodiment in that the two types of tracks, reference position tracks 303A and 303B, are provided on opposite sides of the incremental track 301 (correspondingly, two reference position photo-diode arrays 43 are also provided in the photodiode array 14, while not illustrated). According to this configuration, if the scale 12 is tilted (yawing), those errors due to the yawing may be compensated by averaging signals based on each of the two types of patterns, reference position patterns 33A and 33B.

Fourth Embodiment

Figure 12:
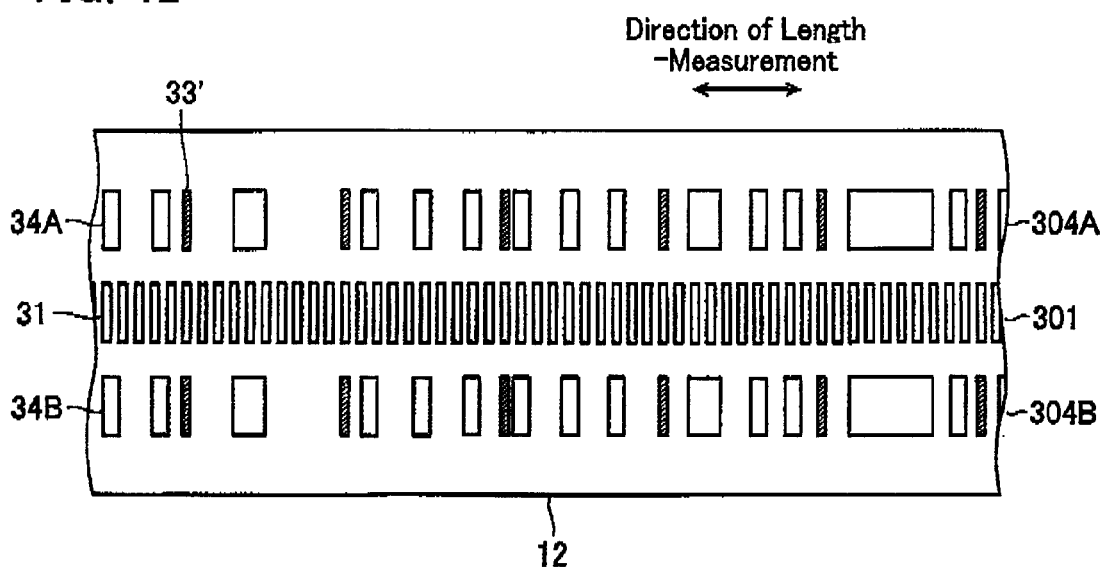
FIG. 12 illustrates a configuration of the scale 12 of an absolute position length-measurement type photoelectric encoder according to a fourth embodiment of the present invention.

FIG. 12 illustrates a configuration of an absolute position detection type encoder according to a fourth embodiment of the present invention. The entire configuration is substantially the same as the first embodiment (FIG. 1) and illustration thereof is omitted hire.

This embodiment is different from the above-mentioned embodiments in that ABS/reference position integrated tracks 304A and 304B similar to the second embodiment are formed on opposite sides of the incremental track 301. According to this configuration, if the scale 12 is tilted (yawing), those errors due to the yawing may be compensated by averaging signals based on each of the two types of patterns, ABS/reference position patterns 34A and 34B.

Fifth Embodiment

Figure 13:
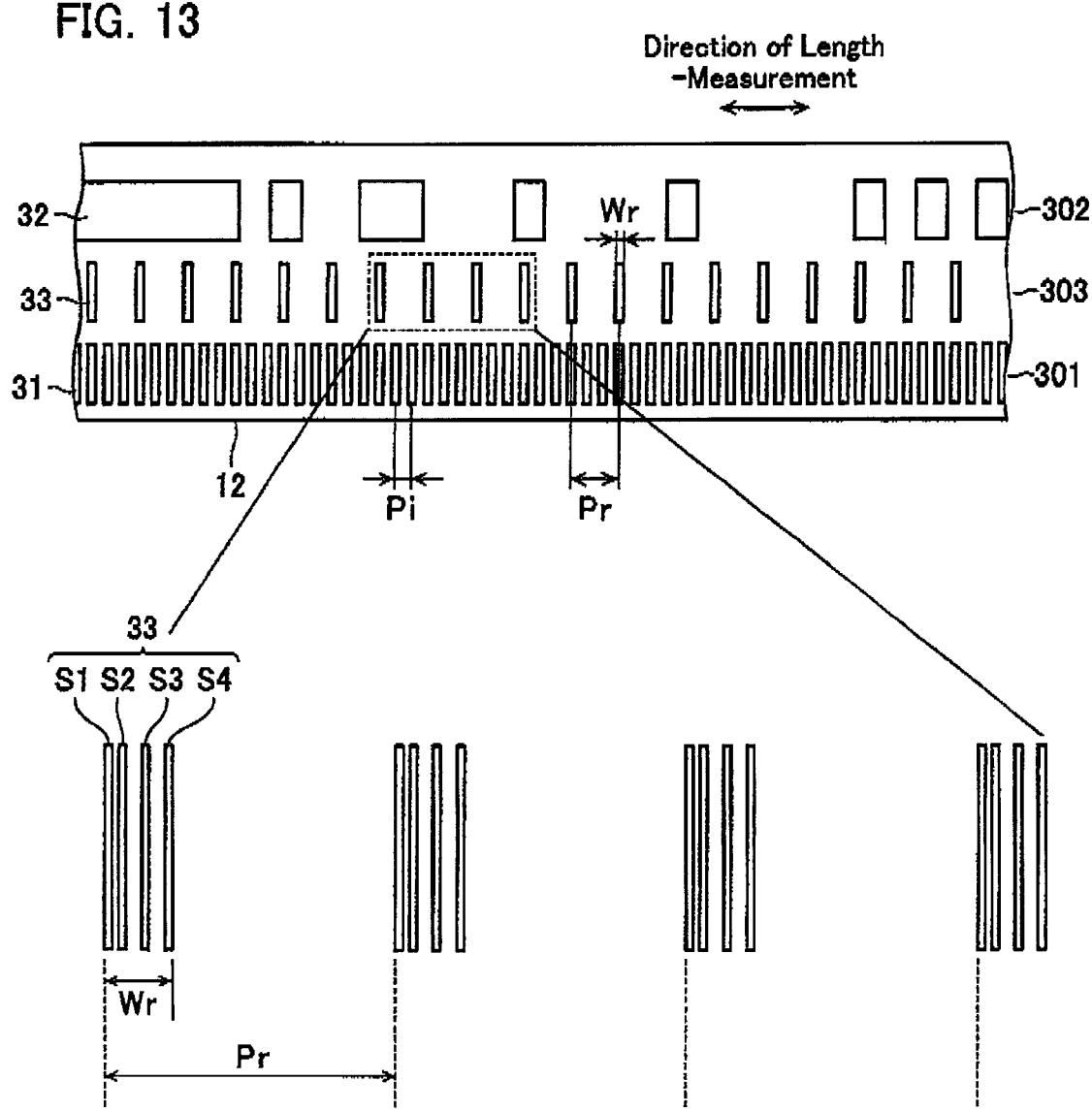
FIG. 13 illustrates a configuration of the scale 12 of an absolute position length-measurement type photoelectric encoder according to a fifth embodiment of the present invention.

FIG. 13 illustrates a configuration of an absolute position detection type encoder according to a fifth embodiment of the present invention. The entire configuration is substantially the same as the first embodiment (FIG. 1) and illustration thereof is omitted here.

The fifth embodiment relates to a modification of the first embodiment. Specifically, A piece of the reference position pattern 33 is not formed of a single pattern as shown in FIG. 1 but is formed of plural patterns S1-S4 that are arranged in an unequal interval.

The plural reference position patterns 33, each of which is formed of such the unequally-arranged patterns S1-S4, are arranged with a width Wr, respectively, and with a pitch Pr.

Such the patterns S1-S4 are disclosed in JP H07-318371A, for example, and used as a origin detection pattern therein. Also in this embodiment, the reference position pattern 33 with such the patterns S1-S4 serves to allow larger position errors of the absolute pattern 32 as described above, and may also be used as a origin detection pattern.

Sixth Embodiment

Figure 14:
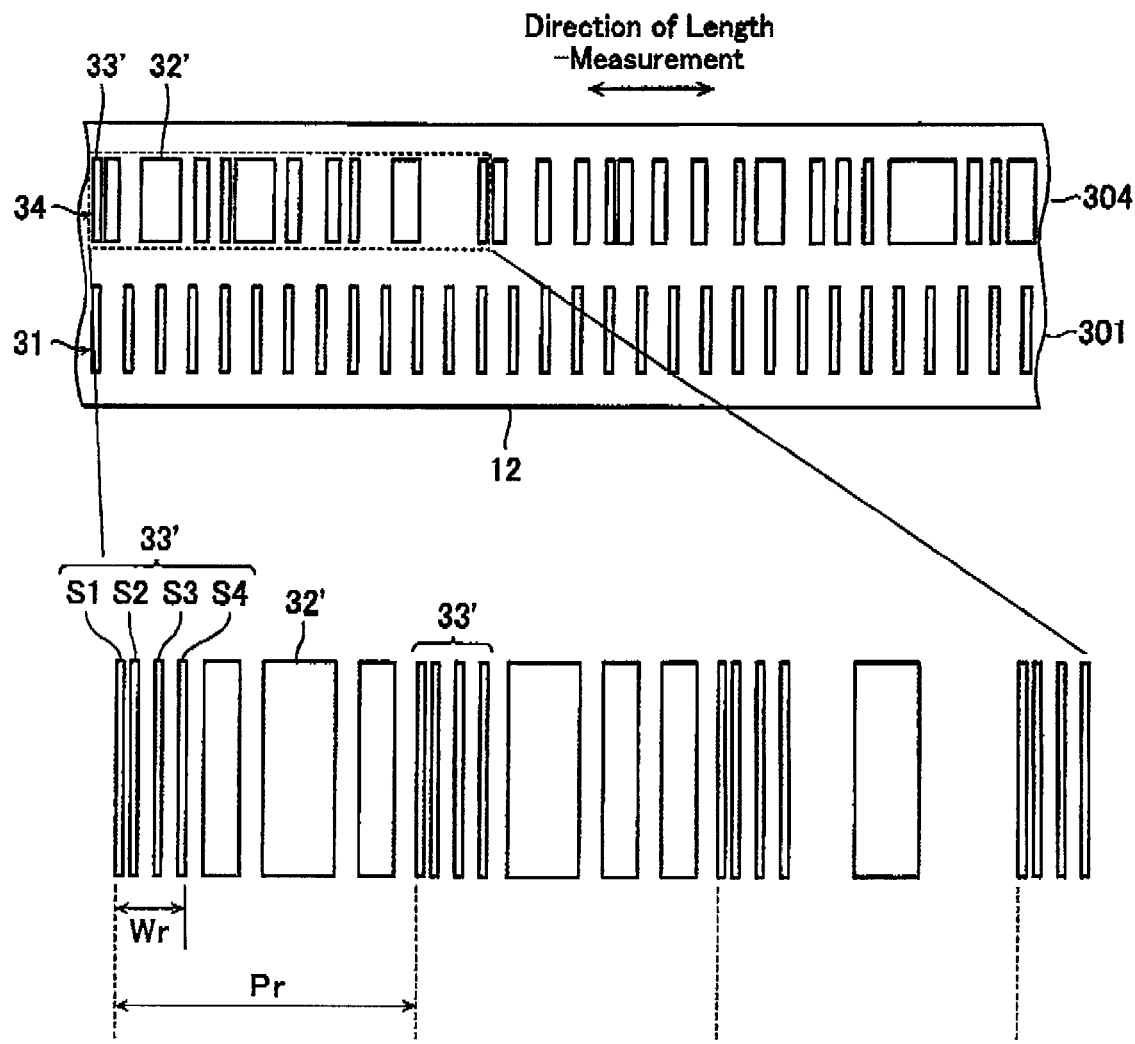
FIG. 14 illustrates a configuration of the scale 12 of an absolute position length-measurement type photoelectric encoder according to a sixth embodiment of the present invention.

FIG. 14 illustrates a configuration of an absolute position detection type encoder according to a sixth embodiment of the present invention. The entire configuration is substantially the same as the first embodiment (FIG. 1) and illustration thereof is omitted here. The sixth embodiment is a modification of the second embodiment. Specifically, a piece of the reference position 33' in the second embodiment is not formed of a single pattern as shown in FIG. 6 and FIG. 7, but is formed of plural patterns S1-S4 that are arranged in an unequal interval. The other configurations are the same as the second embodiment.

Seventh Embodiment

Figure 15:
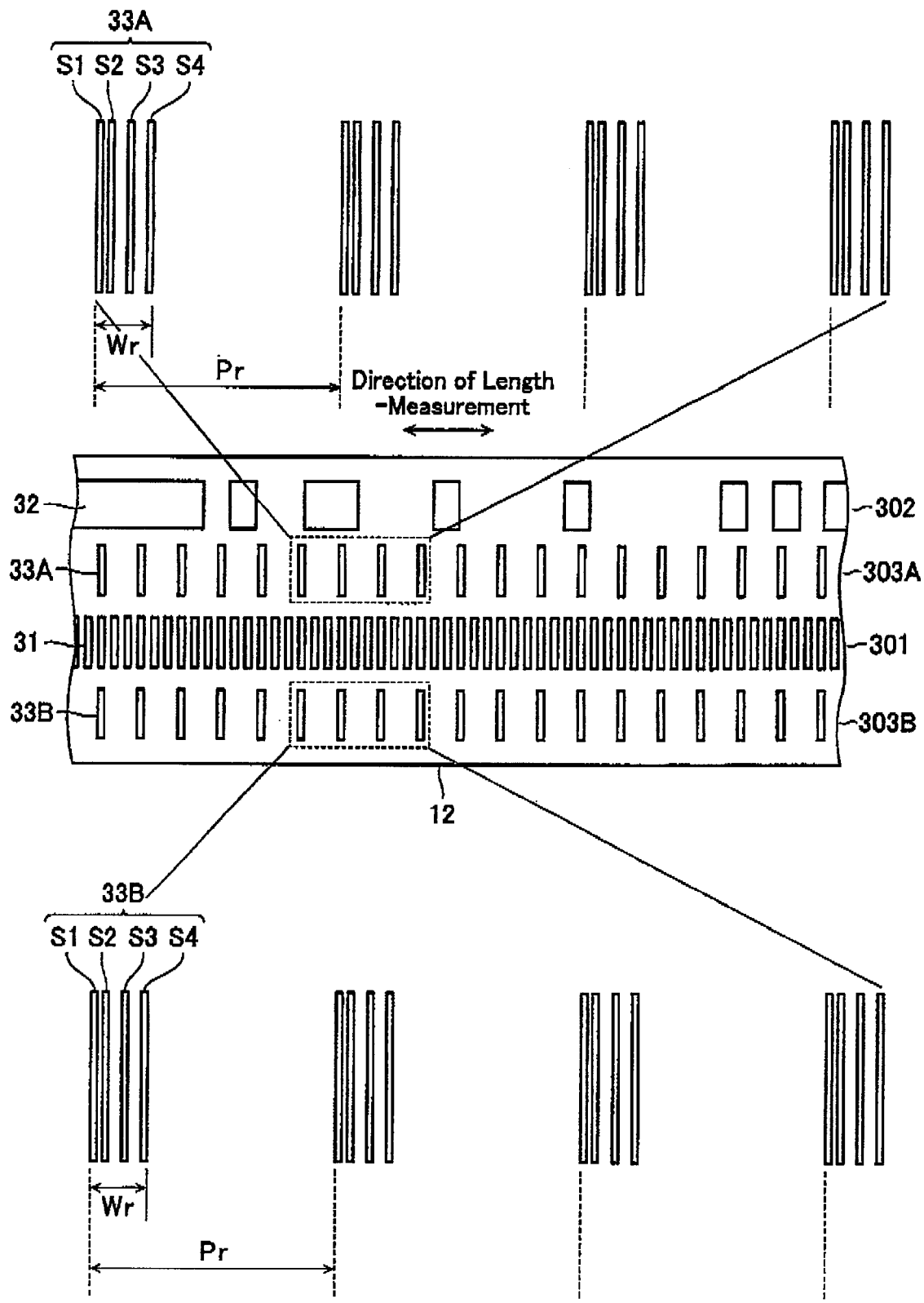
FIG. 15 illustrates a configuration of the scale 12 of an absolute position length-measurement type photoelectric encoder according to a seventh embodiment of the present invention.

FIG. 15 illustrates a configuration of an absolute position detection type encoder according to a seventh embodiment of the present invention. The entire configuration is substantially the same as the first embodiment (FIG. 1) and illustration thereof is omitted here.

The seventh embodiment is a modification of the third embodiment. Specifically, a piece of the reference position 33A and 33B in the third embodiment is not formed of a single pattern as shown in FIG. 11, but is formed of plural patterns S1-S4 that are arranged in an unequal interval. The other configurations are the same as the third embodiment.

Eighth Embodiment

Figure 16:
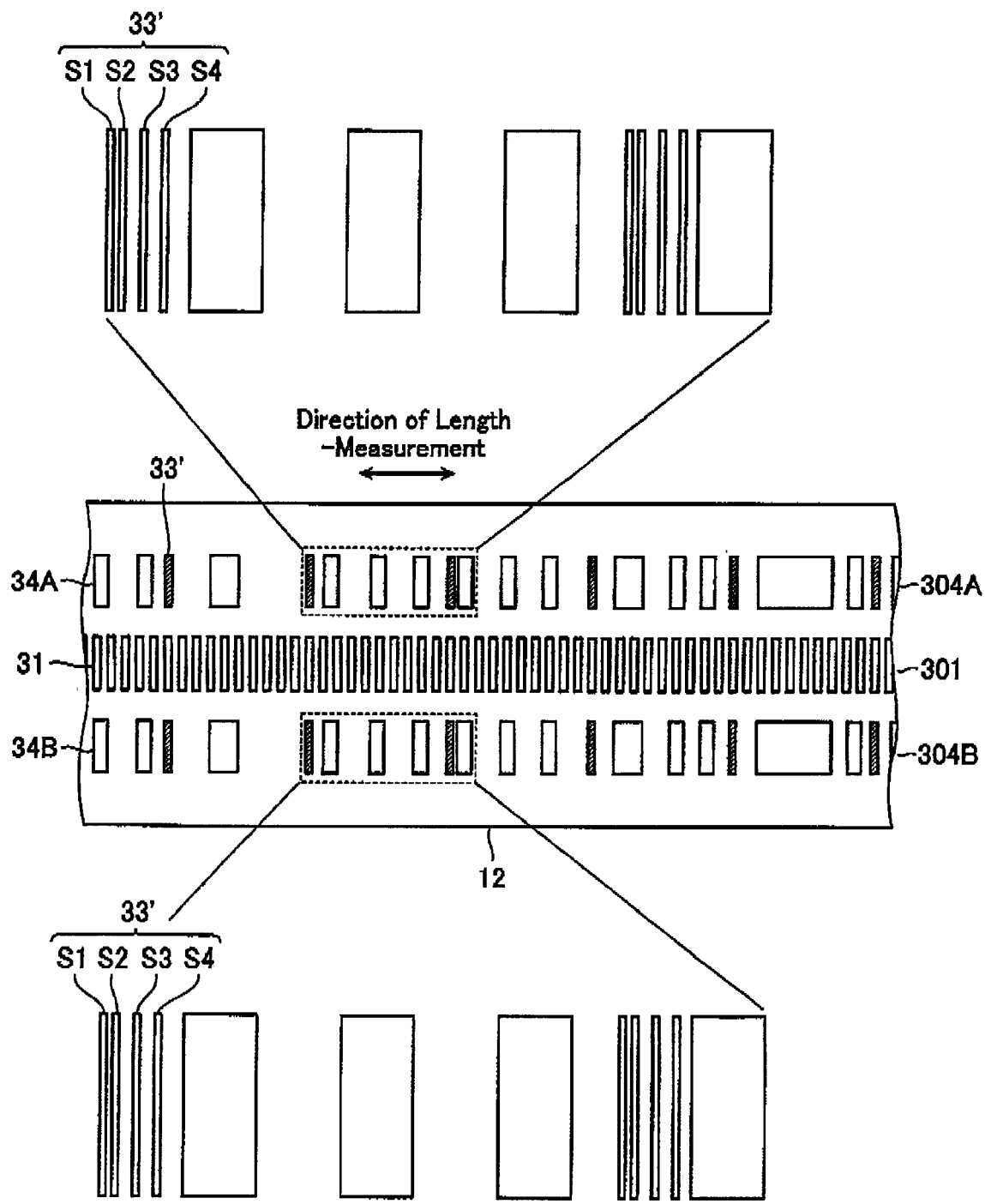
FIG. 16 illustrates a configuration of the scale 12 of an absolute position length-measurement type photoelectric encoder according to a eighth embodiment of the present invention.

FIG. 16 illustrates a configuration of an absolute position detection type encoder according to a eighth embodiment of the present invention. The entire configuration is substantially the same as the first embodiment (FIG. 1) and illustration thereof is omitted here. The seventh embodiment is a modification of the fourth embodiment. Specifically, a piece of the reference position 33' in the fourth embodiment is not formed of a single pattern as shown in FIG. 12, but is formed of plural patterns S1-S4 that are arranged in an unequal interval. The other configurations are the same as the fourth embodiment.

Other Embodiments

Figure 17:
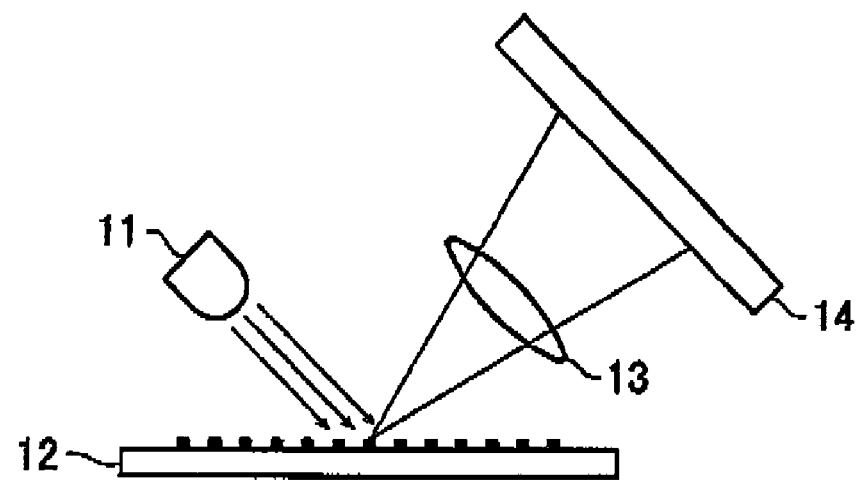
FIG. 17 illustrates a variation of the embodiments.

Although the embodiments of the present invention have been described as above, the present invention is not intended to be limited to the disclosed embodiments and various other changes and additions may be made thereto without departing from the scope of the invention. For example, although the above-mentioned embodiments have been described in the context of a transmissive type photoelectric encoder, as illustrated in FIG. 17, the light-emitting element 11 may be positioned at the same end as the lens 13 and the photodiode array 14 as a reflective type optical system from the light-emitting element 11.

What is claimed is:

1. An absolute position length-measurement type encoder comprising:
 a scale having an incremental track formed therein with incremental patterns including first light and dark patterns formed at equal intervals in first periods, an absolute track formed therein with absolute patterns representing absolute positions, and a reference position track formed therein with reference position patterns including second light and dark patterns formed at equal intervals in second periods longer than the first periods;

a light source for emitting a measurement light to the scale;

a photodetector for receiving the measurement light reflected at or transmitted through the scale; and a signal processing circuit for processing a received-light signal of the photodetector to detect an absolute position of the scale, wherein the signal processing circuit conducts a first judgment about which one of the second periods the scale is located in based on an absolute position signal obtained from the absolute patterns, and then conducts a second judgment about which one of the first periods the scale is located in based on the first judgment and detects an absolute position of the scale based on a result of the first judgment, a reference position signal obtained from the reference position patterns, and a relative position signal obtained from the incremental patterns based on a result of the second judgment.

2. The absolute position length-measurement type encoder according to claim 1, wherein the first period is smaller than a position accuracy of the absolute patterns.

3. The absolute position length-measurement type encoder according to claim 1, wherein the absolute patterns are formed with an accuracy of less than one-half of that in the second periods, in relation to the reference position patterns.

4. The absolute position length-measurement type encoder according to claim 3, wherein the first period is smaller than a position accuracy of the absolute patterns.

5. The absolute position length-measurement type encoder according to claim 1, wherein the first periods are shorter than the second periods by a factor of an integer.

6. The absolute position length-measurement type encoder according to claim 1, wherein each of the absolute patterns represents an absolute position of each of the reference position patterns.

7. The absolute position length-measurement type encoder according to claim 1, wherein the reference position patterns include first and second reference position patterns that are provided on opposite sides of the incremental patterns.

8. The absolute position length-measurement type encoder according to claim 1, wherein the absolute patterns and the reference position patterns are formed on the same track.

9. The absolute position length-measurement type encoder according to claim 8, wherein the absolute patterns and the reference position patterns include first and second absolute patterns and first and second reference position patterns, the first and second absolute patterns and the first and second reference position patterns provided on opposite sides of the incremental patterns.

10. The absolute position length-measurement type encoder according to claim 8, whereon the absolute patterns are erased in a region where the absolute patterns and the reference position patterns overlap each other.

11. The absolute position length-measurement type encoder according to claim 8, wherein the absolute patterns are reduced in size and formed in such a way that the absolute patterns and the reference position patterns does not overlap each other.

12. The absolute position length-measurement type encoder according to claim 1, whereon plural patterns arranged in an unequal interval form an unit, and the units are arranged in an equal interval with the second periods to form the reference position patterns.

13. An absolute position length-measurement type encoder comprising:

a scale having an incremental track formed therein with incremental patterns including first light and dark patterns formed at equal intervals in first periods, an absolute track formed therein with absolute patterns representing absolute positions, and a reference position track formed therein with reference position patterns including second light and dark patterns formed at equal intervals in second periods longer than the first periods;

a light source for emitting a measurement light to the scale;

a photodetector for receiving the measurement light reflected at or transmitted through the scale; and a signal processing circuit for processing a received-light signal of the photodetector to detect an absolute position of the scale, the received-light signal including an absolute position signal obtained from the absolute patterns for indicating an absolute position of the scale, a relative position signal obtained from the incremental patterns for indicating a relative travel distance and travel direction of the scale and a reference position signal obtained from the reference position patterns for indicating reference positions of the reference patterns, wherein the signal processing circuit conducts a first judgment about which one of the second periods the scale is located in based on the absolute position signal obtained from the absolute patterns, detects an amount of signal for the reference position signal, conducts a second judgment about which one of the first periods the scale is located in based on the first judgment and the amount of signal detected, and then calculates absolute position of the scale based on the relative position signal obtained from the result of the second judgment.

14. An absolute position length-measurement type encoder comprising:

a scale having an incremental track formed therein with incremental patterns including first light and dark patterns formed at equal intervals in first periods, a reference position track formed therein with reference position patterns including second light and dark patterns formed at equal intervals in second periods longer than the first periods and an absolute track formed therein with absolute patterns representing absolute positions, the absolute patterns being formed with a predetermined accuracy with respect to the reference positions patterns;

a light source for emitting a measurement light to the scale;

a photodetector for receiving the measurement light reflected at or transmitted through the scale; and a signal processing circuit for processing a received-light signal of the photodetector to detect an absolute position of the scale, wherein the absolute position of the scale is first detected in relation to the reference position patterns based on an absolute position signal obtained from the absolute patterns, then precision absolute position information of the scale is detected according to a reference position signal at least partially based on which one of the second periods of the reference position patterns the scale is located in and a relative position signal based on the incremental patterns and the reference position signal.

* * * * *